June 8, 1926.

N. S. NELSON

TIRE POP VALVE

Filed July 16, 1925

1,588,046

Inventor

NELS S. NELSON

By Irving Harnes

Attorney

Patented June 8, 1926.

1,588,046

UNITED STATES PATENT OFFICE.

NELS S. NELSON, OF PONTIAC, MICHIGAN, ASSIGNOR OF ONE-HALF TO GEORGE A. SUTTON, OF PONTIAC, MICHIGAN.

TIRE POP VALVE.

Application filed July 16, 1925. Serial No. 43,974.

The primary object of my invention is to provide a simple and economical means to be secured to a tire inflation valve for the purpose of releasing excess air over a predetermined pressure when the tire is being inflated.

It is a further object of my invention to provide my valve with a body portion of soft metal and a cap of rigid or stiff metal so that the entire device when assembled will be air tight.

Another object of my invention is to provide a device that can be cheaply manufactured, easily secured to a tire valve so that the valve dust cap can be fitted over the entirety, and one that will not interfere with the inflation of a tire up to a predetermined pressure.

With these and other objects in view, my invention consists in the arrangement, combination and construction of the various parts of my improved device, as described in the specification, claimed in my claim and shown in the accompanying drawing, in which:

Figure 1:
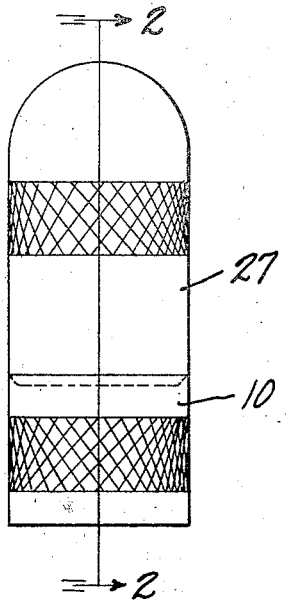
Fig. 1 is a front elevation of my improved device.
Figure 2:
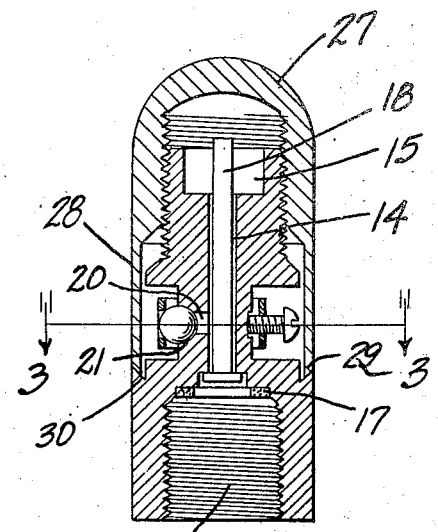
Fig. 2 is a sectional view taken on line 2—2 of Fig. 1.
Figure 3:
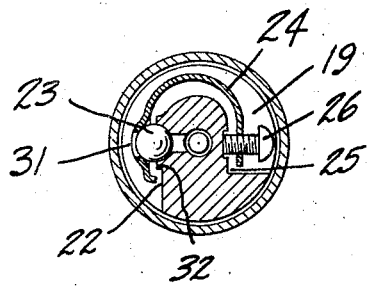
Fig. 3 is a sectional view taken on line 3—3 of Fig. 2.
Figure 4:
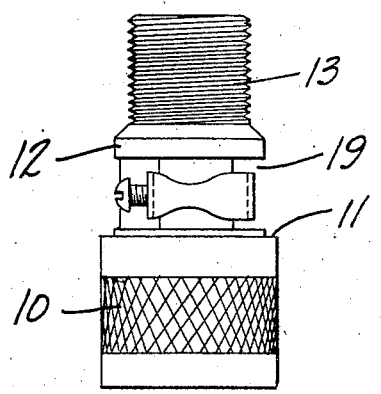
Fig. 4 is a front elevation of the body portion of my improved device.

I have shown a valve body portion 10 having a shoulder 11 and adjacent thereto a reduced top 12, from which extends a threaded stem 13. The shoulder 11 has a groove 30 extending downwardly and inwardly from its edge.

Extending through the entire body portion is an air passage 14 that has the countersunk end 15 in the stem and the opposite end enlarged and threaded, as at 16. A washer 17 is placed in the enlarged end 16 and a pin 18 extends from the enlarged end 16 through the passage and projects from the countersunk end 15 thereof.

Suitably positioned in the top 12 is a slot 19. A port 20 having the ball seat 21, with the offset shoulder 32, extends from one side 22 of the slot 19 into the air passage 14. A ball 23 is positioned in the ball seat 21 by a cupped pocket 31 in a spring clip 24 that is secured on the opposite side 25 of the slot by the tension screw 26.

An internally threaded cap 27, having a reduced lower portion 28 is tapered downwardly and inwardly at its edge 29. The body portion 10 of my device is preferably made of some soft metal as brass, and the cap is made of steel, so that when the cap is threaded onto the stem 13, the edge 29 will firmly fit into the groove 30, thus making the entire device air tight.

In the practical use of my improved device, the body portion 11 is secured to a tire 34 by threading the end 16, of the passage 14 onto a tire valve stem 35 so that the pin 18 will co-act with the pin of the tire valve 36. The tension screw 26 is then either tightened or loosened to set the amount of pressure required to release the ball 23 from its seat. Thus, in filling the tire 34 with air when the predetermined pressure is reached, the air will pass through the port 20 and partially release the ball 23 from its seat 21, the air then passes through and strikes the pocket 31 and due to the additional surface thereof the ball 23 is lifted entirely from its seat 21 for releasing the excess air.

Figure 5:
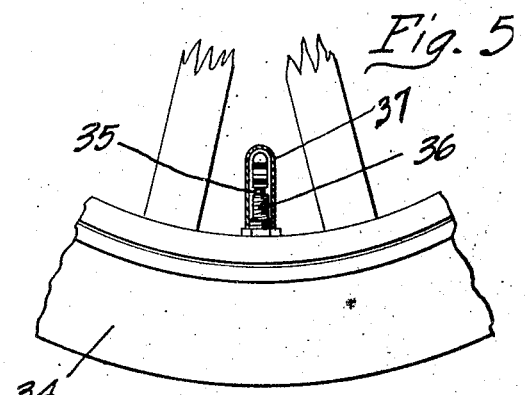
Fig. 5 is a front elevation showing my improved device attached to a tire valve.

It will be noted that my device acts as an air tight cap for the valve 36 and that the conventional type dust cap 37 as shown in Fig. 5 can be placed over my device and secured to the valve.

It is obvious that various changes may be made in the arrangement, combination and construction of the various parts of my improved device without departing from the spirit of my invention, and it is my intention to cover by my claim such changes as may be reasonably included within the scope thereof.

What I claim is:

A device of the class described comprising a body member having a slot therein, a passage extending therethrough, a pin in part of said passage, a port from said passage to said slot, a ball seat in said port, a ball positioned in said seat, a spring clip having a cupped pocket adapted to hold said ball in place until a predetermined pressure is exerted against the same, and a tension screw securing said clip on the opposite side of said ball and adapted to regulate the pressure said spring will withhold.

NELS S. NELSON.